Nov. 30, 1943.　　　S. H. M. DODINGTON　　　2,335,265

PHASE DISCRIMINATOR

Filed July 22, 1942

Inventor

Sven H. M. Dodington.

By Cushman, Darby & Cushman

Attorneys

Patented Nov. 30, 1943

2,335,265

UNITED STATES PATENT OFFICE 2,335,265

PHASE DISCRIMINATOR

Sven H. M. Dodington, Forest Hills, Long Island, N. Y., assignor, by mesne assignments, to Scophony Corporation of America, New York, N. Y., a corporation of Delaware Application July 22, 1942, Serial No. 451,974

2 Claims. (Cl. 172—245)

The present invention relates to phase discriminators.

In many electronic devices, it is desirable to obtain a direct current voltage proportional to the phase displacement between two nominally equal frequencies, yet without obtaining any component of these frequencies and without adding any time delay due to filter networks. Television synchronizing generators, frequency control devices in frequency modulation radio transmitters, and frequency monitoring apparatus are examples of apparatus requiring direct current voltage of the type just referred to.

The principal object of the invention is to provide an apparatus which will produce a direct current voltage proportional to the phase displacement between two nominally equal frequencies.

The apparatus may be generally described as comprising a circuit in which the direct current output voltage developed across a condenser is proportional to the phase displacement between two input voltages which control the discharge of twin triodes in a vacuum tube. An ordinary alternating voltage consisting of a sine wave is impressed upon the plate of one of the triodes and upon the cathode of the other triode, while the other plate and cathode of the respective triodes constitute the output across which is grounded a condenser. The grids of the two triodes are connected together and are adapted to receive a wave form of a controlled frequency consisting of intermittent impulses. The grids are biased beyond cut-off, so that for discharge of either triode to occur, a pulse must be applied to the grids from the controlled source of grid voltage. Upon application of a pulse to the grids, discharge of one of the tubes will occur, depending upon the instantaneous polarity of the alternating voltage impressed upon the plate of the first triode and the cathode of the second triode. This discharge will develop a voltage on the condenser connected across the output plate and cathode of the tube units, either negatively or positively, depending upon the phase relationship; i. e., the lead or lag of the intermittent grid voltage with respect to the sine wave voltage applied to the cathode or plate elements. The potential across the condenser will remain unchanged, since no leak is provided in the condenser circuit, until another pulse is applied to the grids. The potential across the condenser will, at all times, be proportional to the amount of lead or lag between the phases of the two input voltages and to the magnitude of the sine wave current at the moment the intermittent pulses are applied to the grids. Thus, a uni-directional voltage proportional to the phase displacement is obtained across the condenser until there is a change of the phase relationship between the two input voltages from lagging to leading or vice versa. Upon the occurrence of such a change in phase relationship, the voltage across the condenser must necessarily change, and should the phase relationship change from lag to lead there will be a change in polarity of the voltage across the condenser.

Figure 1:
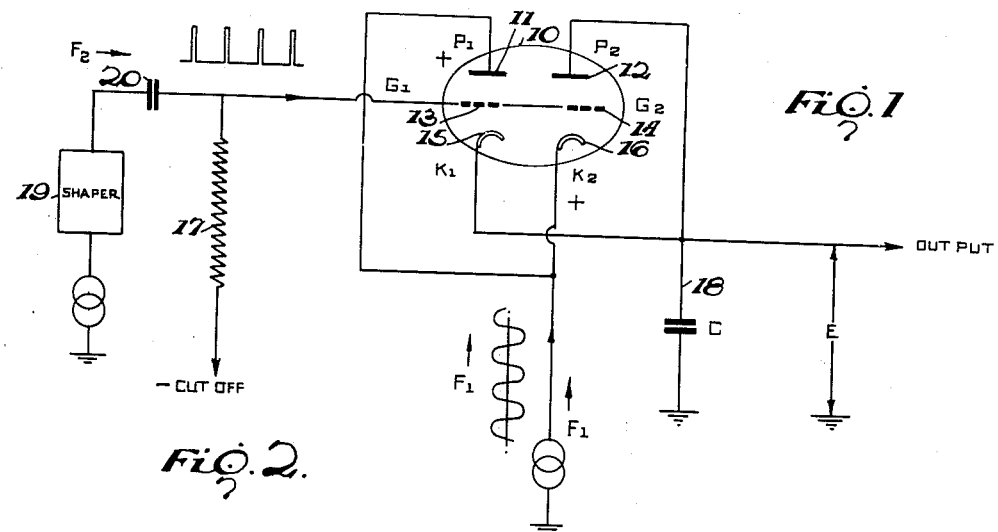
Figure 1 is a schematic wiring diagram of the phase discriminator of the present invention.

Referring to Figure 1 of the drawing, a twin triode tube 10 is shown having plate elements 11 and 12, grid elements 13 and 14 and cathode elements 15 and 16. The grid elements 13 and 14 are connected together and are biased to cut-off by the grid resistor 17 connected to a suitable source of negative bias voltage. Plate 11 of the first triode unit is connected to cathode 16 of the second triode unit and these two elements are connected to a source of 60 cycle alternating current which will be the frequency $F_1$ to be compared. Cathode 15 of the first triode unit and plate 12 of the second triode unit are connected together and constitute the output of the tube, across which the condenser 18 is grounded. The value of condenser 18 depends upon the frequencies which are applied to the phase discriminator, and at 60 cycles, which is to be the illustrated form of the invention, a one-tenth microfarad condenser 18 may be used. A second frequency $F_2$ to be compared in phase relationship with frequency $F_1$ and nominally similar to $F_1$ or, in other words, of 60 cycle frequency, is impressed upon the grids 13 and 14. The frequency $F_2$ is shaped by a shaper generally shown at 19 to the form of an intermittent pulse of positive voltage at 60 cycle frequency and is coupled by the coupling condenser 20 to the grids 13 and 14. The normal voltage for the frequencies $F_1$ and $F_2$ may be in the region of 20 to 200 volts depending upon the range of voltage E which may be desired to be obtained in the output of the discriminator.

With the circuit above described, the phase relationship or phase displacement between frequency $F_1$ and frequency $F_2$ may be determined, and a voltage E across the condenser 18 will be developed proportional to the phase displacement between the two frequencies. To operate the circuit the grids 13 and 14 are biased beyond cut-off so that the tube does not function. When the frequency $F_2$ in the form of an intermittent pulse of positive voltage is applied to the grids, the bias upon the grids is reduced so that the tube becomes operative to discharge and an output will appear on either cathode 15 or plate 12 depending upon the polarity of phase frequency $F_1$ at the instant that the tube functions. Since the condenser 18 does not have a leak in parallel, the charge developing in the output across the condenser 18 will be maintained until the tube again discharges to develop a different voltage E. This voltage appearing across the condenser 18 is a uni-directional voltage which is proportional to the phase displacement between the frequency $F_1$ and the intermittent pulse frequency $F_2$ and may be either positive or negative depending upon the phase relationship.

Figure 2:
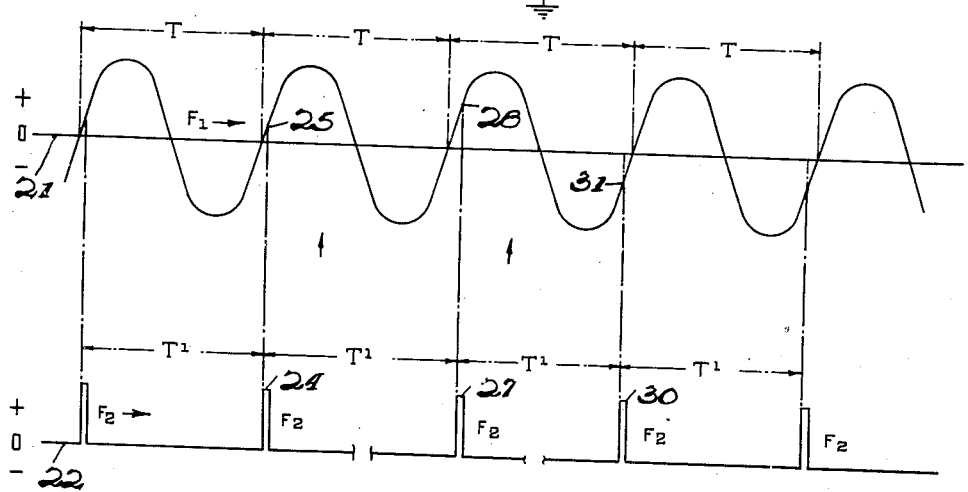
Figure 2 is a graphic illustration of the phase relationship between the two nominally equal frequencies $F_1$ and $F_2$, $F_1$ being shown as a sine wave, and $F_2$ as an intermittent pulse.
Figure 3:
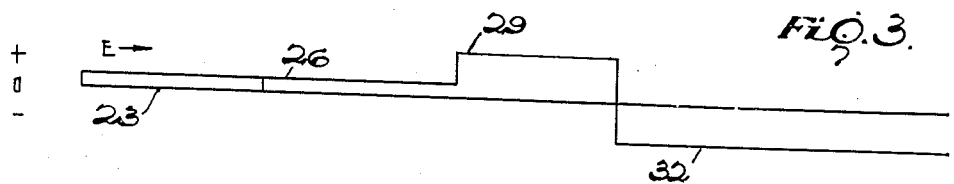
Figure 3 shows a graphic illustration of the voltage E obtained by the discriminator of this invention in proportion to the phase displacement of the frequencies $F_1$ and $F_2$.

Referring to Figures 2 and 3 of the drawing, a better understanding of the phase relationship of frequencies $F_1$ and $F_2$ together with the proportional value of the voltage E may be obtained. Frequency $F_1$ is shown as a sine wave fluctuating about the base line 21 and having the time interval T equivalent to 60 cycles per second. Frequency $F_2$ is shown as an intermittent pulse of positive voltage, pulsing on the base line 22 and having a time interval $T_1$ nominally similar to time interval T and also of 60 cycles per second. The voltage E obtained across the output of the phase discriminator of this invention is shown with regard to the base line 23 and is proportional to the phase displacement between the pulses $F_2$ and frequency $F_1$. As shown in the drawing, the time interval T for the frequency $F_1$ remains constant at 60 cycles per second, but to illustrate the invention and the proportional changes in the voltage E obtained by a change in phase displacement between frequencies $F_1$ and $F_2$, the time interval $T_1$ for the frequency $F_2$ has been distorted, although it is intended that the frequency $F_2$ remain at 60 cycles per second. The distorted time intervals are shown in Figure 2 of the drawing where the base line 22 is broken.

The frequency $F_1$ which is applied to cathode 16 and plate 11 is constantly fluctuating at 60 cycles per second as shown. The frequency pulse $F_2$ is likewise pulsing at 60 cycles per second and as shown at 24, the pulse is lagging slightly behind the second cycle of the frequency $F_1$, and at the moment that the pulse 24 is applied to the grids 13 and 14, the amplitude of the frequency $F_1$ will be as shown at 25 and will give a proportional output voltage of E corresponding to 26. If the pulse $F_2$ occurs as at 27 to be lagging still further behind the phase of the third cycle of frequency $F_1$, the moment that the pulse is applied to grids 13 and 14 and that the tube discharges will find the frequency $F_1$ having an amplitude as at 28, and thus a positive voltage E as at 29 will be developed across condenser 18. If, however, the pulse of frequency $F_2$ should lead in phase with respect to the frequency $F_1$, the pulse, as shown at 30, when applied to the grids 13 and 14, would find the frequency $F_1$ at a negative amplitude, as shown at 31, and as a result the voltage E obtained across condenser 18 would be negative to the extent shown at 32. Should the phase relationship between frequencies $F_1$ and $F_2$ remain further unchanged the voltage E would remain unchanged as shown in the drawing.

One of the obvious uses of the phase discriminator of this invention is in connection with a synchronizing generator or oscillator as used in television. In television synchronizing generators, it is necessary to maintain an accurate phase relationship between the line scanning frequency, the frame scanning frequency and the power line frequency. In an apparatus for producing a 525 line picture, such as commonly used in this country, these frequencies are respectively 15,750, 60 and 60 cycles. The timing units for such generators usually start out with a master oscillator running at twice the line frequency, i. e., 31,500 cycles, followed by conventional frequency dividing circuits which reduce the frequency to 15,750 for the line scanning frequency and to 60 for the frame scanning frequency. The frame scanning frequency is then compared with the 60 cycle power line frequency and the difference in voltage is used to correct any drift in the master oscillator. Heretofore, this correcting voltage has included a great deal of 60 cycle component which had to be filtered out, providing a time lag too great for accurate phasing between frame frequency and power line frequency. As has been made clear, the present invention provides a practically steady direct current voltage proportional to the phase displacement of two nominally similar frequencies, requires a minimum of filtering, and allows short time delay and consequent tight phasing between the power line frequency and the frame frequency.

It may be pointed out that the input current applied to cathode 16 and plate 11 of the discriminator of the present invention need not be of sine wave form and that any periodic wave having a fair portion of its wave form displacing a fairly linear change with respect to time will be satisfactory. For example, a saw tooth form wave may be satisfactorily used.

The twin triode specifically shown may be replaced by two separate triodes or pentodes if higher frequencies or other conditions make this desirable. Also while I have specifically shown a fixed bias to bias the tube units to cut-off, other forms of bias such as self bias may be successfully employed.

I claim:

1. In an apparatus for obtaining a direct current voltage proportional to the phase displacement between two nominally equal frequencies, a tube having two triode units, the plate of one triode unit and the cathode of the second triode unit being connected together and to a source of current of one frequency, the grids of both triode units being biased to cut-off and connected together to a second frequency source having a frequency nominally similar to that of the first source, an output connected to the cathode of the first-named triode unit and the plate of the second triode unit, and a condenser grounded across said output to maintain a uni-directional charge proportional to the phase displacement between the two frequencies.

2. In an apparatus for obtaining a direct current voltage proportional to the phase displacement between two nominally equal frequencies, two tube units, each tube unit having at least control grid, cathode and plate elements, the plate of one tube unit and the cathode of the second tube unit being connected together and to a source of current of one frequency, the grids of both tube units being biased to cut off and connected together to a second frequency source having a frequency nominally similar to that of the first source, an output connected to the cathode of the first named tube unit and the plate of the second tube unit, and a condenser grounded across said output to maintain a uni-directional charge proportional to the phase displacement between the two frequencies.

SVEN H. M. DODINGTON.